Feb. 10, 1953    R. G. OSBORNE    2,627,642
METHOD OF VESICULATION
Filed March 17, 1950
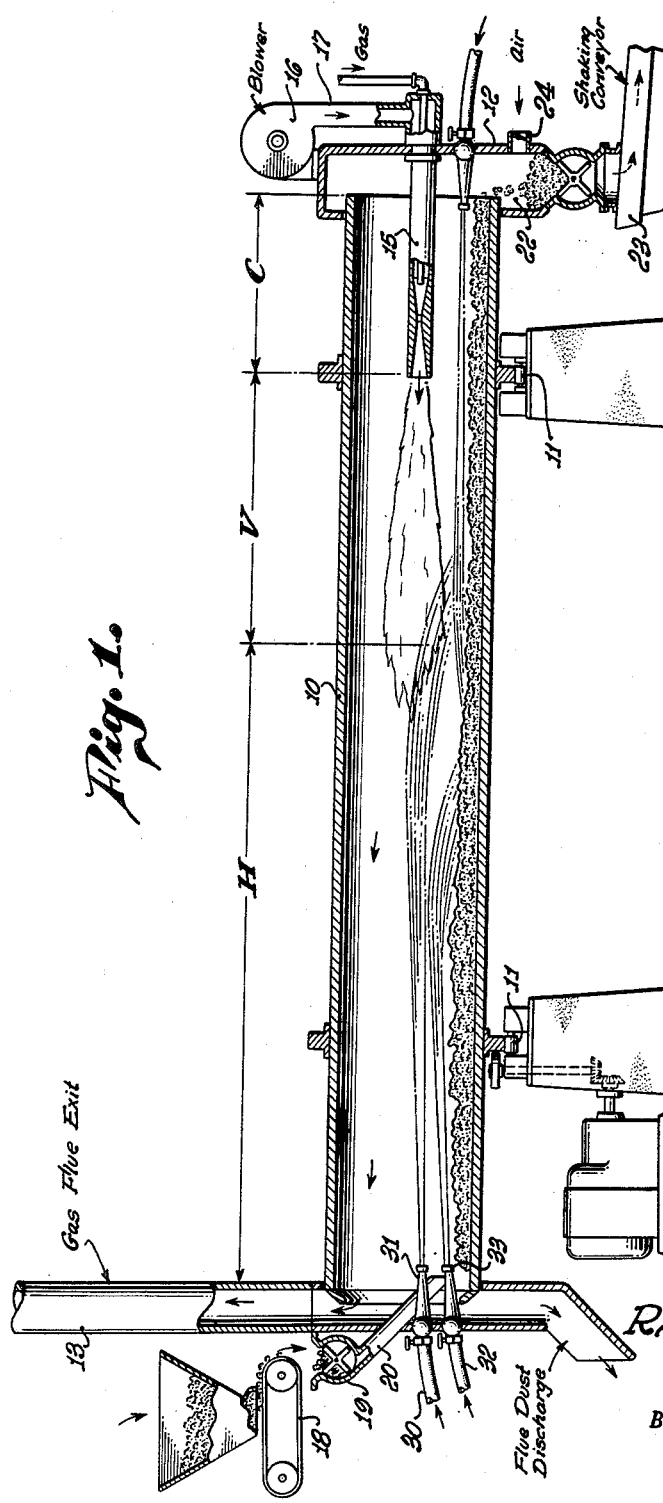
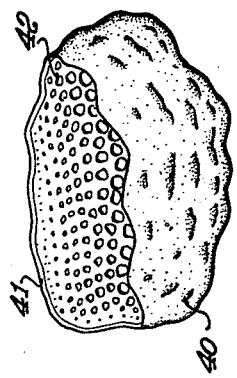
RAYMOND G. OSBORNE,
INVENTOR.
BY
ATTORNEY Patented Feb. 10, 1953

2,627,642

UNITED STATES PATENT OFFICE 2,627,642

METHOD OF VESICULATION

Raymond G. Osborne, Los Angeles, Calif., assignor of one-fourth to Raymond G. Osborne, Jr., one-fourth to Howard S. Osborne, and one-fourth to Philip S. Osborne Application March 17, 1950, Serial No. 150,250

5 Claims. (Cl. 25—157)

This invention pertains to the production of vesiculated, lightweight, argillaceous aggregates capable of being used effectively in cementitious compositions, concrete, gypsum compositions and wherever a lightweight, structurally strong aggregate is desirable. The invention particularly relates to a method of controlling the vesiculation of argillaceous materials and the formation of a vesiculated particle having a desired strong surface film.

For a great many years it was known that argillaceous materials such as clays and shales of the character commonly used in the ceramic industry and many clays deemed undesirable for use in earthenware, sewer pipe, and other ceramic composition or products, would expand and become porous and vesiculated upon being heated to temperatures approximating incipient fusion. It has also been known that argillaceous materials containing appreciable quantities of carbon, sulfur and iron exhibited these vesiculating characteristics to a greater extent than clays such as ball clay or the purer kaolinites. During the course of years, many attempts have been made to commercially exploit this property of argillaceous materials and to produce vesiculated or porous, lightweight products capable of being used in concrete, cement blocks and other cementitious compositions.

Argillaceous materials vary greatly in composition, structure, apparent density, content of water of hydration, molecular ratios between silica, alumina and the alkaline earths, etc. These, as well as the many variations and variables which are created by a manufacturing process, have made it difficult to manufacture vesiculated argillaceous aggregates and produce a consistent product. It has been difficult to produce a product from argillaceous material quarried from a deposit in one state, which would be comparable to the product manufactured in another state from a different deposit. One of the objects of this invention is to disclose and provide a method of control which is applicable to the manufacture of vesiculated aggregates from different source materials.

In order to be of value in a cementitious composition, a vesiculated aggregate must have other characteristics besides light weight and porosity. For example, one method which has been described in the literature comprised forming masses of clinker from clay or other argillaceous material, this clinker being vesicular in character. Upon cooling, such clinker had to be crushed and graded in order to obtain particles of a desired size. During such crushing great quantities of fines and waste material of undesirable size were made. Even though the particles were of a desired size, they were rough and irregular in contour (thereby impairing the workability of cementitious mixes) and were provided with rough, pitted surfaces caused by the exposure of internal vesiculations. During the normal mixing of cementitious mixtures, such as concrete, the particles were partially crushed and portions thereof were broken. Furthermore, excessive quantities of water were absorbed by these particles, since their porosities were, to some extent, exposed and intercommunicating; as a result, large quantities of water were contained within these particles, the drying of cementitious objects formed with such aggregate was delayed and the escape of such moisture was associated with an increased shrinkage in direct ratio with the excess amount of water used, often resulting in serious cracks and failure of the molded or formed structure.

The present invention is directed to the production of a vesiculated aggregate which is provided with a strong, fairly dense, surface film, the central and major portions of each particle of aggregate being efficiently vesiculated. As a result, the aggregate produced in accordance with the present invention is very much stronger and is free from many of the objectionable characteristics hereinbefore referred to. The present invention discloses a method whereby each particle of aggregate is provided with a relatively thin oxidized surface layer of high strength while the interior is virtually unoxidized and porous, this result being attained without the use of added surface coatings such as sand which would unnecessarily increase the weight of the aggregate and the cost of manufacture.

Furthermore, in accordance with this invention, the atmosphere in the kiln (used in vesiculating the aggregate) is controlled in a selective manner whereby reactions with water vapor or steam are obtained and certain zones of the kiln are kept in oxidizing conditions while oxidation is restricted in other areas or zones.

It is an object of the present invention, therefore, to disclose and provide means, methods and conditions of operation whereby vesiculated particles provided with strong surface films may be readily obtained.

Moreover, it is an object of the invention to provide a method of operation whereby the thickness of the reinforcing, strengthening surface film may be readily controlled without the addition of substances such as quartz or refractory fire clay which increase the weight of the aggregate.

These and other objects and advantages of the present invention will be readily appreciated by those skilled in the art from the following description. For purposes of illustration and facility of understanding, reference will be had to the appended drawings, in which:

Fig. 1 diagrammatically illustrates a rotary kiln in which the method of the present invention may be carried out.

Fig. 2 is a side elevation, partly in section, of a particle of vesiculated clay made in accordance with the present invention.

Although argillaceous materials may be vesiculated in a great variety of equipment, probably the simplest form is a rotary kiln of the type generally used in the manufacture of Portland cement, etc., and for this reason Fig. 1 illustrates a rotary kiln 10 mounted for axial rotation upon suitable rollers 11 and provided with a fire head 12 at its lower end and a stack 13 at its upper end. Suitable burners, such as 15, preferably water cooled and supplied with controllable amount of air, as by blowers 16, and conduit 17, are carried by the fire end, whereas argillaceous material to be vesiculated is fed into the upper end as by means of a conveyor 18, valve 19 and chute 20. The vesiculated aggregate is discharged through an air cooled outlet 22 into a shaker conveyor 23 and sent to storage or may pass through a cooling tumbler or the like.

In order to attain greatest efficiency, it is highly desirable that the argillaceous particles fed to the kiln or furnace be graded and within a relatively narrow range in size so that a vesiculated aggregate also of a narrow range and size is produced, the size of the raw material being fed to the kiln being correlated to the finished aggregate desired, due allowance being made for the increase in size or volume caused by vesiculation and expansion. The argillaceous material being supplied to the kiln may be crushed and graded shale or it may be in the form of molded or extruded pellets. In some instances, it is desirable to grind the argillaceous material to a relatively fine state of division, mix it with added water (occasionally some oil or carbonaceous material may be added although, in general, such additions are not necessary), compress and extrude the moistened mass through dies having openings of a desired size and break up the extruded streams into particles of desired length. It is often important to dry the pellets before introducing them into the furnace.

It will be noted that the incoming, moisture-containing particles of argillaceous material move from the feed end of the kiln to the discharge end in counter-current relation to the hot fire gases. Rotation of the kiln raises the particles upwardly along the uprising side of the kiln, the particles eventually cascading down; this repeated action imparts a zigzag course to the particles. The length of the kiln may be divided into a heating zone, indicated at H, a zone of maximum heat, or bloating zone, indicated by V, and a relatively short cooling zone, indicated at C. The major length of the kiln is used in preheating the material and the so-called heating zone may comprise from 65% to 80% of the length of the kiln. In accordance with the method of this invention, the zone of maximum heat, indicated by V, wherein vesiculation takes place, is relatively short and ordinarily does not exceed 15%–20% of the total kiln length. The cooling zone is generally short, being on the order of 10%–15% of the length of the kiln.

In prior or normal operation of a rotary kiln, the atmosphere throughout the length of the kiln was oxidizing in character. As a result each particle of the product was oxidized throughout. By the process of this invention, only a thin outer skin of oxidized material is obtained. I find that rapid oxidation during the actual vesiculation or bloating is necessary, but it is desirable to prevent oxidation during the preheating period and up to the zone of active bloating. If an oxidizing atmosphere during vesiculation is not provided, then the expansion of the particles exposes large areas of incipiently fused, molten and sticky material which tends to cause the particles to stick to the lining of the kiln or to each other and form unmanageable masses and large lumps or conglomerates. In order to maintain an oxidizing atmosphere in zones C and V, I admit adequate and controlled quantities of air by means of blower 16 and air intakes 24.

It is to be remembered that the present invention is directed to a method whereby the particles, in large part at least, maintain their individuality and do not coalesce or adhere to one another, but instead, are discharged as discrete vesiculated particles which need not be crushed or otherwise broken apart. In accordance with this invention an oxidizing atmosphere is maintained in cooling zone and the active bloating zone, but the atmosphere in the rest of the kiln is diluted and therefore the production of very heavy, refractory oxidized surfaces on the particles during preheating is prevented. This I accomplish by injecting a stream or streams of water under high pressure supplied by line 30 and nozzle 31, such stream being directed upon the preheated particles at a suitable point in the kiln not less than 50% nor more than 75% of the kiln length from the feed end.

It is to be remembered that the material not only travels longitudinally from the feed end to the discharge end of the kiln, but also moves transversely, riding up one side of the kiln and slipping down so that each particle is tumbled and is capable of receiving the results of the jet of water. It is to be understood that I am not limited to the employment of but a single jet directed to the zone defined hereinabove; other auxiliary jets, such as those supplied by line 32 and nozzle 33, may be used to lightly spray the material at other areas of the heating zone. These high pressure streams of water generate steam and dilute the combustion gases, reducing the oxidizing characteristics of the gases and preventing the formation of excessive oxidized films on the particles. Moreover, it is believed that when the water jet is directed onto particles at a temperature of between about 1200° F. and 1800° F., and such particles are heated in an atmosphere containing water vapor, reactions take place, involving partial rehydration and orientation of the silicates, which render the argillaceous material more active and facilitate more extensive and finer vesiculation during subsequent and higher heating. It should be apparent that the water injected into the furnace will remain in liquid phase only for a very short time and that the major effect is caused by the presence of high temperature water vapor in large quantities. In consequence it is to be further understood that one or all of the streams of water may be advantageously replaced by a stream or streams of high pressure steam, capable of being directed with reasonable accuracy to critical zones of the furnace or kiln.

At all events, the neutral or steam-filled atmosphere generated in this manner insures the production of a product which is vesiculated throughout and which is provided with a relatively light, but dense and strong, external film.

It is to be remembered that the quantity of water injected in the manner stated is only sufficient to generate proper atmospheric conditions in the preheating zone H of the kiln and only sufficient to permit the argillaceous particles to be heated without a softening or oxidation of the outer surface areas. Since the particles do not develop a crusty, oxidized surface during such preheating and before bloating, the particles do not become distorted and do not crack open to exude the sticky, incipiently fused and less refractory contents during bloating in zone V and do not stick to the lining or to each other, the presence of an oxidizing atmosphere in zone V assuring the rapid production of a light skin of oxidized, non-sticky material. Rounder vesiculated particles of good workability in concrete mixes are obtained by my process.

The resulting aggregate resembles that illustrated in Fig. 2. The external contour of the particle depends upon the manner in which feed material has been prepared, but in most instances is somewhat irregular. The external surface, indicated at 40, is, on the whole free from holes or pits, or exposed, artificially created porosities. As indicated in the section, each particle is provided with a relatively dense oxidized surface film 41, whereas the virtually unoxidized central area 42 is filled with minute, well-dispersed bubbles and air spaces, most of which are not in communication with each other. The porosities may vary in size from 0.001 in. to 0.1 in. in average dimension, although occasionally even larger porosities are observed, most of them being macroscopic.

Vesiculated aggregate varying in apparent density from 1 to 1.4 is readily prepared. The crushing strength of the lightweight aggregate produced in accordance with this invention is materially higher than that of aggregates prepared by other methods and such increased strength is evidenced by the compressive strength of concretes made therefrom.

It will be apparent from the above description that I have disclosed a novel process whereby within a single kiln; both oxidizing and virtually neutral or unoxidizing conditions can be maintained. Means and methods have been disclosed whereby atmospheric conditions can be selectively controlled. The process, moreover, appears to facilitate and utilize high-temperature reactions between argillaceous materials and water vapor or steam. By reason of its flexibility the process produces a better, stronger vesiculated aggregate from a great variety of clays.

All changes and modifications coming within the scope of the appended claims are embraced thereby.

I claim:

1. A method of controlling the vesiculation of argillaceous materials and the formation of vesiculated particles having a desired strong surface film which comprises: forming argillaceous particles of relatively narrow range in size; feeding said particles through a heating zone in counterflow relation to hot fire gases into a zone of maximum heat and then through a cooling zone; and controllably introducing regulatable quantities of water from an external source into the heating zone and at a zone just prior to the passage of the particles into the zone of maximum heat.

2. In a method of manufacturing lightweight vesiculated aggregate from argillaceous material in a continuous manner, the steps of: gradually increasing temperature of the particles of argillaceous material to a temperature of between about 1450° F. and 1600° F. in a substantially neutral atmosphere consisting largely of high temperature water vapor, said vapor being derived in major part from a source other than the argillaceous material subjecting the particles to a vesiculating temperature in an oxidizing atmosphere consisting largely of free air and combustion gases for a period of time of between about 15% and 20% of the total time involved in the method herein stated, and then cooling the particles.

3. In a method of manufacturing lightweight, vesiculated aggregate from argillaceous material, the steps of: feeding particles of argillaceous material through a relatively long heating zone in counterflow relation to hot fire gases, then into a relatively short zone of maximum heat and then through a cooling zone; restraining said particles from vesiculation prior to entry into the zone of maximum heat by controllably introducing regulatable quantities of water from a separate source into the heating zone and onto the particles therein while said particles are at a temperature of between about 1200° F. and 1800° F. and before passage of said particles into the zone of maximum heat.

4. In a method of manufacturing lightweight, vesiculated aggregate from argillaceous material, the steps of: subjecting a constantly moving stream of particles of argillaceous material into a counterflow exposure with hot fire gases in a heating zone and then moving the particles into a vesiculating zone of maximum heat wherein temperatures exceed 1800° F., and preventing the formation of excessive oxidized films on the surface of the particles by introducing regulatable quantities of water from a separate source into the heat zone and onto particles therein while said particles are at a temperature of between about 1200° F. and 1800° F. and before said particles move into the vesiculating zone of maximum heat.

5. A method of controlling the vesiculation of argillaceous materials and the formation of vesiculated particles having a desired strong surface film which comprises: feeding argillaceous particles through a heating zone in counterflow relation to hot fire gases into a zone of maximum heat and then through a cooling zone; gradually increasing the temperature of the particles to between about 1450° F. and 1600° F. in said heating zone and then rapidly subjecting the particles to a vesiculating temperature in the zone of maximum heat; and restraining said particles from vesiculation and excessive temperature in the heating zone by introducing water onto said particles while in the heating zone and while said particles are at a temperature of between about 1200° F. and 1600° F.

RAYMOND G. OSBORNE.

REFERENCES CITED

The following references are of record in the file of this patent:

UNITED STATES PATENTS

| Number | Name | Date |
|---|---|---|
| 1,466,571 | Thorssell et al. | Aug. 28, 1923 |
| 2,035,845 | Stanton | Mar. 31, 1936 |
| 2,268,816 | Gabeler et al. | Jan. 6, 1942 |
| 2,430,601 | Cleary | Nov. 11, 1947 |